(12) United States Patent
Han

(10) Patent No.: US 8,329,331 B2
(45) Date of Patent: Dec. 11, 2012

(54) TERMINAL CONNECTOR ASSEMBLY AND BATTERY MODULE HAVING THE SAME

(75) Inventor: Dae-Won Han, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 44 days.

(21) Appl. No.: 12/177,789

(22) Filed: Jul. 22, 2008

(65) Prior Publication Data

US 2009/0123820 A1    May 14, 2009

(30) Foreign Application Priority Data

Nov. 12, 2007 (KR) ........................ 10-2007-0114935

(51) Int. Cl.
*H01M 2/26* (2006.01)
*H01R 24/00* (2011.01)
*H01R 33/00* (2006.01)

(52) U.S. Cl. ......... 429/121; 429/123; 439/627; 439/500

(58) Field of Classification Search .................. 429/121, 429/122–347; 29/623.1–623.5; 439/627, 439/507–512, 500
See application file for complete search history.

(56) References Cited

U.S. PATENT DOCUMENTS

| | | | | |
|---|---|---|---|---|
| 2,678,962 A * | 5/1954 | Jensen | ........................ | 429/181 |
| 4,158,802 A * | 6/1979 | Rose, II | ........................ | 320/109 |
| 4,470,652 A * | 9/1984 | Schwab | ........................ | 439/509 |
| 4,724,189 A | 2/1988 | Chase | | |
| 4,736,921 A * | 4/1988 | Zane et al. | ................. | 248/316.2 |
| 5,677,079 A | 10/1997 | DeZorzi | | |
| 5,733,674 A | 3/1998 | Law et al. | | |
| 5,900,332 A | 5/1999 | Marukawa et al. | | |
| 2006/0078789 A1 | 4/2006 | Wegner | | |
| 2006/0270277 A1* | 11/2006 | Zhao et al. | ................. | 439/627 |
| 2007/0141452 A1 | 6/2007 | Kim | | |
| 2008/0182162 A1 | 7/2008 | Kim | | |
| 2009/0072785 A1 | 3/2009 | Moon | | |
| 2009/0123819 A1 | 5/2009 | Kim | | |
| 2009/0202897 A1 | 8/2009 | Kim et al. | | |

(Continued)

FOREIGN PATENT DOCUMENTS

EP          0084338 A      7/1983

(Continued)

OTHER PUBLICATIONS

Machine Translation of JP H09-190811 originally published Jul. 1997 to Eguro et al.*

(Continued)

*Primary Examiner* — Basia Ridley
*Assistant Examiner* — Jonathan G Leong
(74) *Attorney, Agent, or Firm* — Knobbe, Martens, Olson & Bear, LLP (57) ABSTRACT

The present invention relates to a rechargeable battery module. The battery module includes a plurality of unit batteries, a connecting member, and a pressure member. The plurality of unit batteries includes electrode terminals protruded from the unit batteries. The electrode terminals are inserted to a connecting member, and the connecting member includes a fitting portion including a gap on one side of the fitting portion, and a connecting part for connecting the fitting portions while having the gap between the connecting parts. The pressure member compresses the connecting parts so as to narrow a gap between the connecting parts.

16 Claims, 6 Drawing Sheets

U.S. PATENT DOCUMENTS

| | | |
|---|---|---|
| 2010/0119928 A1 | 5/2010 | Yoon |
| 2010/0178548 A1 | 7/2010 | Baek |

FOREIGN PATENT DOCUMENTS

| | | |
|---|---|---|
| EP | 1 309 019 A2 | 5/2003 |
| EP | 1498964 A | 1/2005 |
| EP | 1 746 679 A1 | 1/2007 |
| EP | 1 705 743 B1 | 9/2007 |
| GB | 2294578 A | 5/1996 |
| JP | 08-293300 | 11/1996 |
| JP | H09-190811 * | 7/1997 |
| JP | 10-003950 | 1/1998 |
| JP | 10-106533 | 4/1998 |
| JP | 10-270095 | 10/1998 |
| JP | 11-054157 | 2/1999 |
| JP | 11144766 A2 | 5/1999 |
| JP | 2001-126703 | 5/2001 |
| JP | 2001-155789 | 6/2001 |
| JP | 2001-307695 | 11/2001 |
| JP | 2001-345088 | 12/2001 |
| JP | 2001-345089 | 12/2001 |
| JP | 2002-184385 | 6/2002 |
| JP | 2002-298822 | 10/2002 |
| JP | 2002-352793 | 12/2002 |
| JP | 2002359014 A2 | 12/2002 |
| JP | 2003-109558 | 4/2003 |
| JP | 2003-109675 | 4/2003 |
| JP | 2004-087218 | 3/2004 |
| JP | 2005-026219 | 1/2005 |
| JP | 2005-349955 | 12/2005 |
| JP | 2006-127921 | 5/2006 |
| JP | 2006-179190 | 7/2006 |
| KR | 0176553 | 4/2000 |
| KR | 10-20010036651 | 5/2001 |
| KR | 1020060028057 | 3/2006 |
| KR | 1020060045008 | 5/2006 |
| KR | 10-2006-0104070 | 10/2006 |
| KR | 1020070006956 | 1/2007 |
| KR | 1020070014658 | 2/2007 |
| KR | 10-20070089615 | 8/2007 |
| WO | WO 2007/001345 | 8/2005 |
| WO | WO 2008/093181 | 8/2008 |

OTHER PUBLICATIONS

EP Search Report for related EP Application No. 08168712.1-1227, Feb. 4, 2009.

EP Search for corresponding EP 08150025.8 dated Aug. 12, 2010.

* cited by examiner

FIG.6

TERMINAL CONNECTOR ASSEMBLY AND BATTERY MODULE HAVING THE SAME

CROSS-REFERENCE TO RELATED APPLICATION

This application claims priority to and the benefit of Korean Patent Application No. 10-2007-0114935 filed in the Korean Intellectual Property Office on Nov. 12, 2007, the entire content of which is incorporated herein by reference.

BACKGROUND OF THE INVENTION (a) Field of the Invention

The present invention relates to a battery module. More particularly, the present invention relates to a rechargeable battery module for improving an assembling configuration of unit batteries to reduce resistance.

(b) Description of the Related Art

A rechargeable battery is capable of being charged and discharged, while a primary battery may not be charged.

A low capacity rechargeable battery formed by one battery cell formed in a pack is used for small portable electronic devices such as a mobile phone, a laptop computer, and a camcorder, and a large capacity battery is used for power sources for driving a motor such as for a hybrid vehicle.

The rechargeable battery is manufactured in various shapes, and typical shapes are a cylinder and a rectangle. In the rechargeable battery, a separator, that is an insulator, is provided between an anode and a cathode. The rechargeable battery also includes an electrode group which is formed by winding electrodes in a spiral shape which are positioned in a case. A cap assembly having an outer terminal is combined to the case containing the electrode.

A high power rechargeable battery using a non-aqueous electrolyte of high energy density has been recently developed. A plurality of these rechargeable batteries can be coupled in series to form a large capacity battery module so that the high power rechargeable battery may be used for a device requiring high power (e.g., a motor in an electric vehicle).

Generally, one battery module includes a plurality of rechargeable batteries (hereinafter referred to as "unit batteries") coupled in series, and the rechargeable battery is formed in a cylindrical or rectangular shape.

To form the battery module by coupling the respective unit batteries in series, anode and cathode terminals protruded from the cap assembly of the unit battery are arranged to connect to cathode and anode terminals of adjacent unit batteries, respectively. In addition, a nut is provided to connect an anode terminal, formed as a screw, to a cathode terminal of an adjacent unit battery.

That is, respective electrode terminals have male threads and nuts that fix the terminals to the cap assembly. A connection part for electrically coupling the anode terminal of a unit battery and the cathode terminal of an adjacent unit battery is combined with the nut, and another nut is combined as a connection part to interconnect the terminals.

However, in the conventional configuration, it takes quite a long time to mount the connection part, and a manufacturing process is complicated. In addition, since the nut is used as a medium to connect the connection part to the nut, contact resistance may occur at a connected part.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a battery module for efficiently connecting electrode terminals and reducing contact resistance generated in a connecting member.

According to an exemplary embodiment of the present invention, a battery module includes a plurality of unit batteries, a connecting member, and a pressure member. The plurality of unit batteries includes electrode terminals protruded from the unit batteries. The electrode terminals are inserted to a connecting member, and the connecting member includes fitting portions, including a gap on one side of the fitting portions, and a pair of connecting parts for connecting the fitting portions while having the gap between the connecting parts. The pressure member compresses the connecting parts so as to narrow the gap between the connecting parts.

The connecting parts may include a hole, and the pressure member may include a bolt inserted to the hole and a nut screwed with the bolt. The connecting parts may include a nut groove to which the nut is inserted.

A plurality of protrusions may be formed on an inner circumference of the fitting portions, the protrusion may be extended in a height direction of the fitting portions, and the plurality of protrusions may be arranged along an inner circumference of the fitting portions while having intervals between the protrusions.

The connecting member may include a body forming an outer shape and a conductor being close to an inner surface of the body. The body may be formed as an electrical insulator.

The conductor may include a fitting portion conductive plate being adjacent to the fitting portion and a connecting part conductive plate being adjacent to the conductive plate, and the fitting portion conductive plate may include an elastic protrusion.

The elastic protrusion may be extended in a height direction of the connecting member, and the elastic protrusion may be provided as a multiple of protrusions to be arranged along an inner circumference of the fitting portions while having intervals between the elastic protrusions.

A groove may be formed on an external surface of the connecting part, and a pressure member formed in a clip shape may be inserted into the groove. The pressure member may include a base and supporting parts extended from both ends of the base and inserted to the groove to inwardly compress the connecting part.

A protrusion may be formed on a surface of the clip touching the groove in the supporting part. The protrusion may be extended in a width direction of the supporting part. The supporting part may be bent at a right angle to the base.

According to another exemplary embodiment of the present invention, a battery module includes unit batteries, a connecting member, and a pressure member. The unit batteries are repeatedly charged and discharged. The connecting member electrically connects the unit batteries, and includes penetration holes to which terminals formed in the unit battery are inserted and a gap connecting the penetration holes. The pressure member compresses an external surface the connecting member so that an inner surface of the penetration hole may be close about an external surface of the electrode terminal.

According to the exemplary embodiment of the present invention, since electrode terminals are inserted to a fitting portion, a pressure member is provided to the fitting portion, and unit batteries may be electrically connected, an assembling process may be simplified and productivity is improved.

In addition, since a gap between connecting parts are narrowed by providing the pressure member, an inner circumference of the fitting portion may be close to the electrode terminal.

Further, since a plurality of protrusions are provided on an inner surface of the fitting portion and the protrusions are close to the fitting portion, contact resistance between a connecting member and the electrode terminal may be reduced.

In addition, since the connecting member includes a body formed as an insulator and a conductor being close to the body, stability of an assembling process may be improved.

Since an elastic protrusion is formed on the conductor and a shape of the protrusion is varied by the pressure member to be close to the electrode terminal, the contact resistance between the electrode terminal and the connecting member may be reduced.

Since a pressure member formed in a clip shape is formed on the connecting member, the connecting member may be easily provided.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
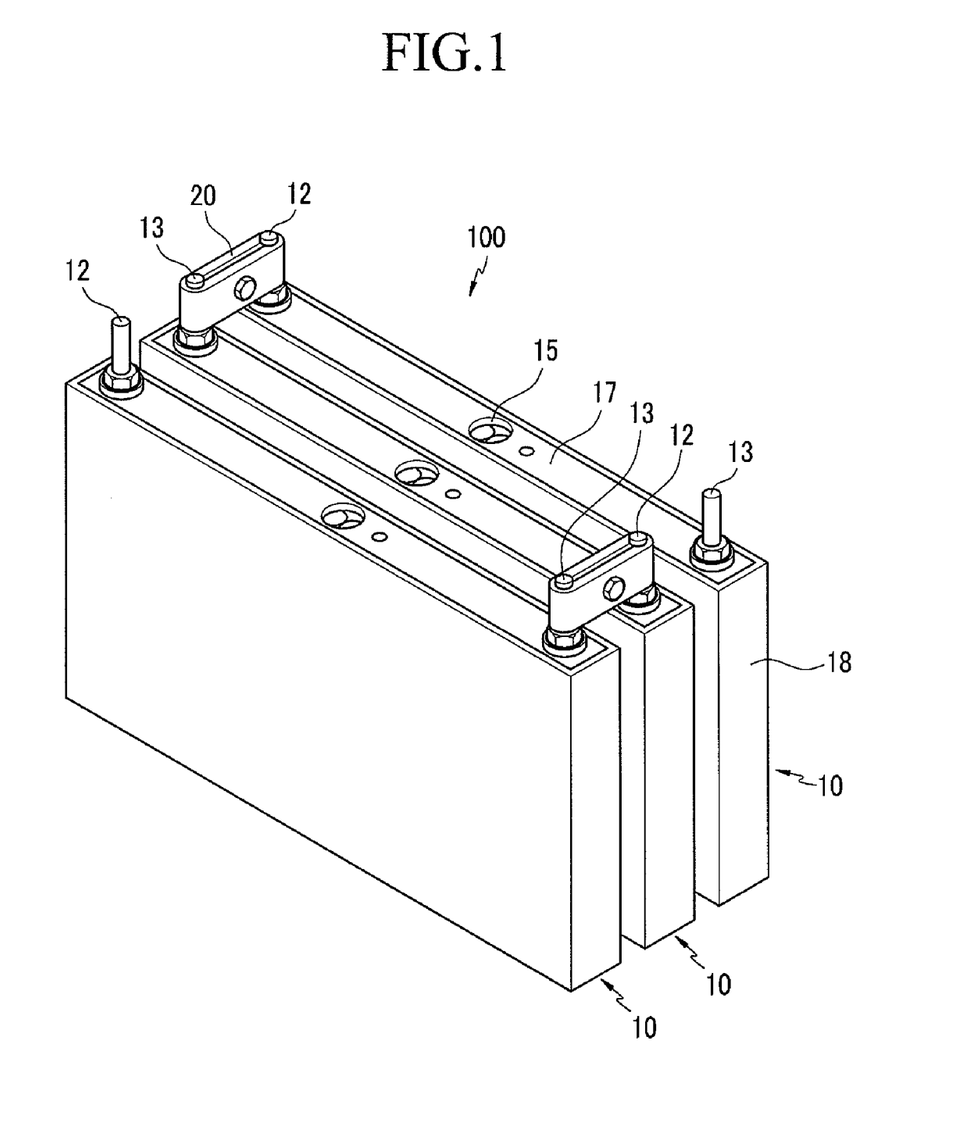
FIG. 1 is a perspective view of a battery module according to a first exemplary embodiment of the present invention.

FIG. 1 is a perspective view of a battery module according to a first exemplary embodiment of the present invention.

Referring to FIG. 1, a battery module 100 according to the first exemplary embodiment of the present invention includes a plurality of unit batteries 10 and a connecting member 20 for electrically connecting the unit batteries 10.

The unit battery 10 includes a rectangular case 18 and a cap plate 17 connected to an opening formed on an upper part of the case 18.

In the first exemplary embodiment of the present invention, it is described that each unit battery 10 is formed in a rectangular shape, but it is not limited thereto, and various shapes may be formed without departing from the spirit of the present invention.

The cap plate 17 includes a vent portion 15 that is opened when the internal pressure of the unit battery 10 increases and electrode terminals, including anode and cathode terminals 12 and 13. The anode and cathode terminals 12 and 13 are electrically connected to an electrode group (not shown) provided in the unit battery 10, and the anode and cathode terminals 12 and 13 are respectively protruded from an upper surface of the cap plate 17.

The electrode terminals 12 and 13 that protrude from the upper surface of the cap plate 17 of each unit battery 10 alternate at an upper surface of the cap plate 17 of neighboring unit batteries 10. More specifically, the battery units 10 are arranged so that anodes 12 are positioned adjacent cathodes 13 on the neighboring adjacent battery units 10 in the manner shown in FIG. 1.

In addition, a barrier rib (not shown) may be provided for use as a passage for a coolant between the unit batteries 10 to cool the battery module 100.

In the above battery module 100, a connecting member 20 for electrically connecting the anode and cathode terminals 12 and 13 of the neighboring unit batteries 10 is provided to connect the respective unit batteries 10 in series. The connecting member 20 is formed as a conductor, and is used to electrically connect the electrode terminals 12 and 13 and neighboring battery units 10 in the manner shown in FIG. 1.

Figure 2:
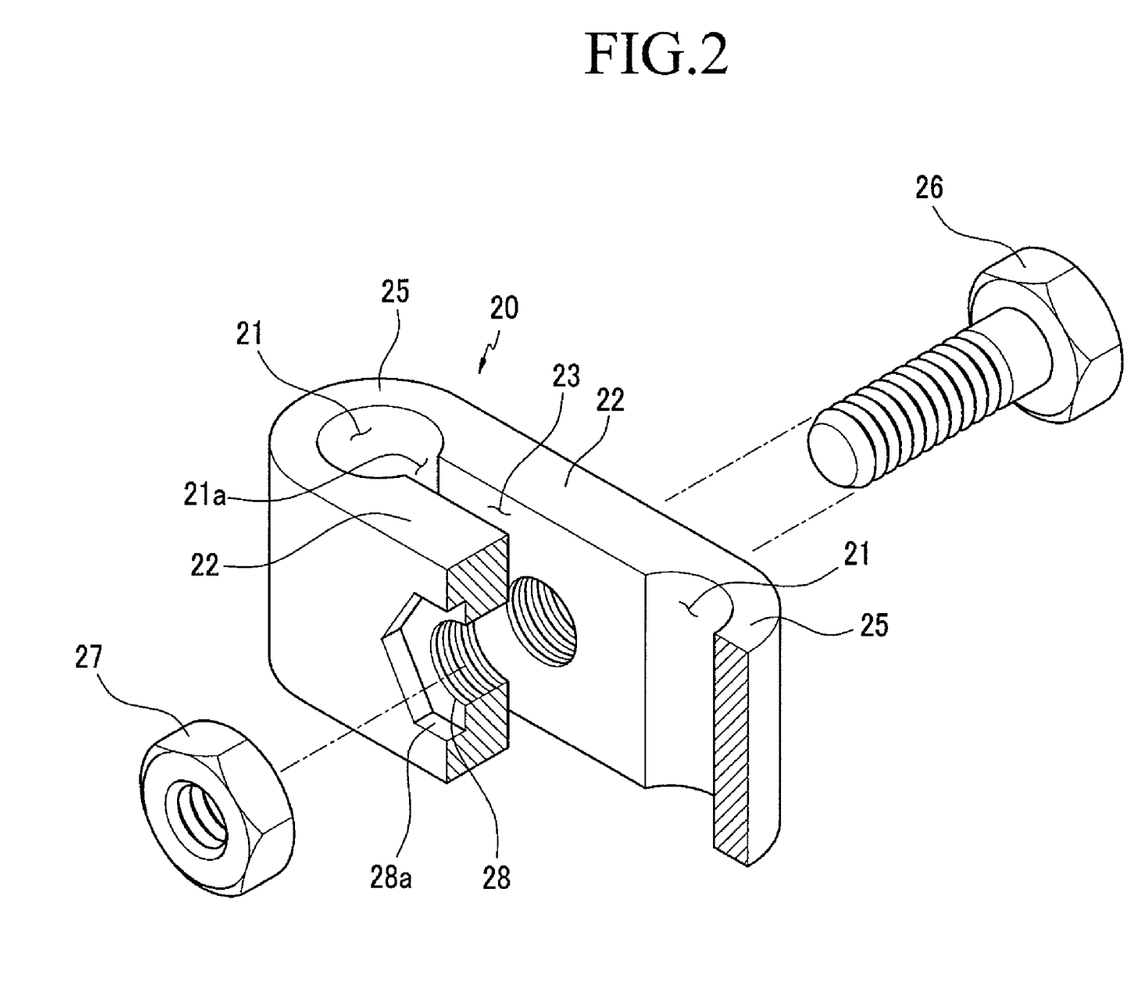
FIG. 2 is a partially cut-away perspective view representing a connecting member and a pressure member according to the first exemplary embodiment of the present invention.

FIG. 2 is a partially cut-away perspective view representing a connecting member and a pressure member according to the first exemplary embodiment of the present invention.

Referring to FIG. 2, the connecting member 20 includes fitting portions 25, each including a penetration hole 21 through which the electrode terminals 12 and 13 are inserted, and connecting parts 22 connecting the fitting portions 25.

The fitting portions 25 are respectively formed at both end parts of the connecting member 20, and gaps 21a (FIG. 3) are formed at the fitting portions 25 such that the respective gaps 21a face each other. The connecting parts 22 are formed at edge of the fitting portions 25 to connect the fitting portions 25, and a gap 23 is formed between the connecting parts 22. The gap 23 is formed between the gaps 21a of the neighboring fitting portions 25. Accordingly, a cross-section of a space formed by the gap 23 and the penetration holes 21 is formed in a dumbbell shape.

In addition, a pressure member 24 for inwardly pressuring the connecting parts 22 is provided to the connecting parts 22, and the pressure member 24 includes, in one implementation, a bolt 26 and a nut 27.

The connecting parts 22 include a hole 28, and the bolt 26 is combined through the hole 28. A nut groove 28a is formed on an outer surface of the connecting part 22 where the nut 27 is provided, and the nut 27 is inserted into the nut groove 28a. The bolt 26 is screwed into the nut 27.

Figure 3:
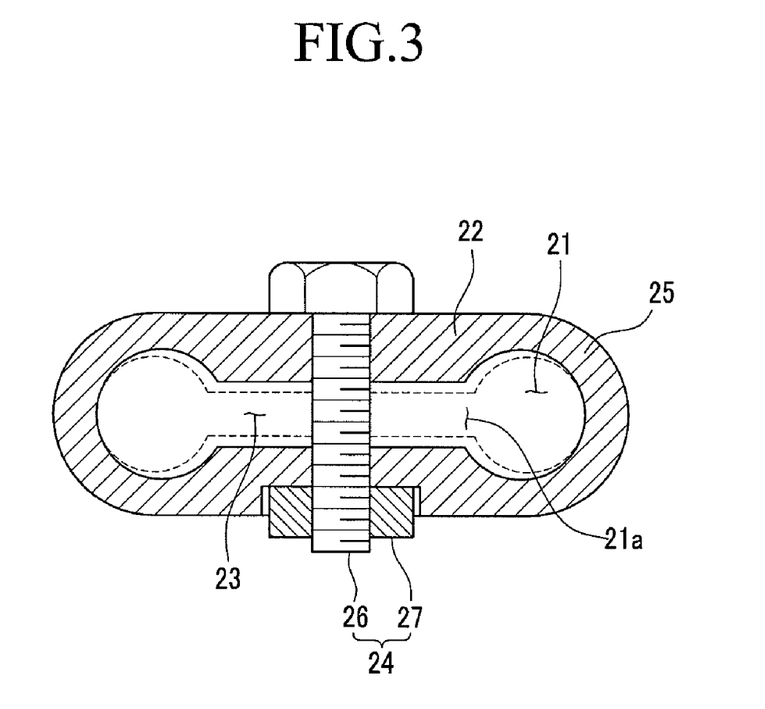
FIG. 3 is a cross-sectional view representing a connecting member and a pressure member according to the first exemplary embodiment of the present invention.

Referring to FIG. 3, as the bolt is tightened, the bolt 26 and the nut 27 inwardly compress the connecting parts 22 so that the gap 23 and the gaps 21a are narrowed as shown by dotted lines.

When the gap 21a is narrowed, each of the fitting portions 25 are bent to be close or adjacent to the external circumferential surfaces of the electrode terminals 12 and 13, and therefore the fitting portions 25 and the electrode terminals 12 and 13 may be contacted to each other over a larger area.

According to the first exemplary embodiment of the present invention, the electrode terminals 12 and 13 are inserted into the connecting member 20, the pressure member 24 is provided to the connecting member 20, and the unit batteries 10 may be stably connected. Therefore, a process for interconnecting battery units is simplified and productivity is improved.

Figure 4:
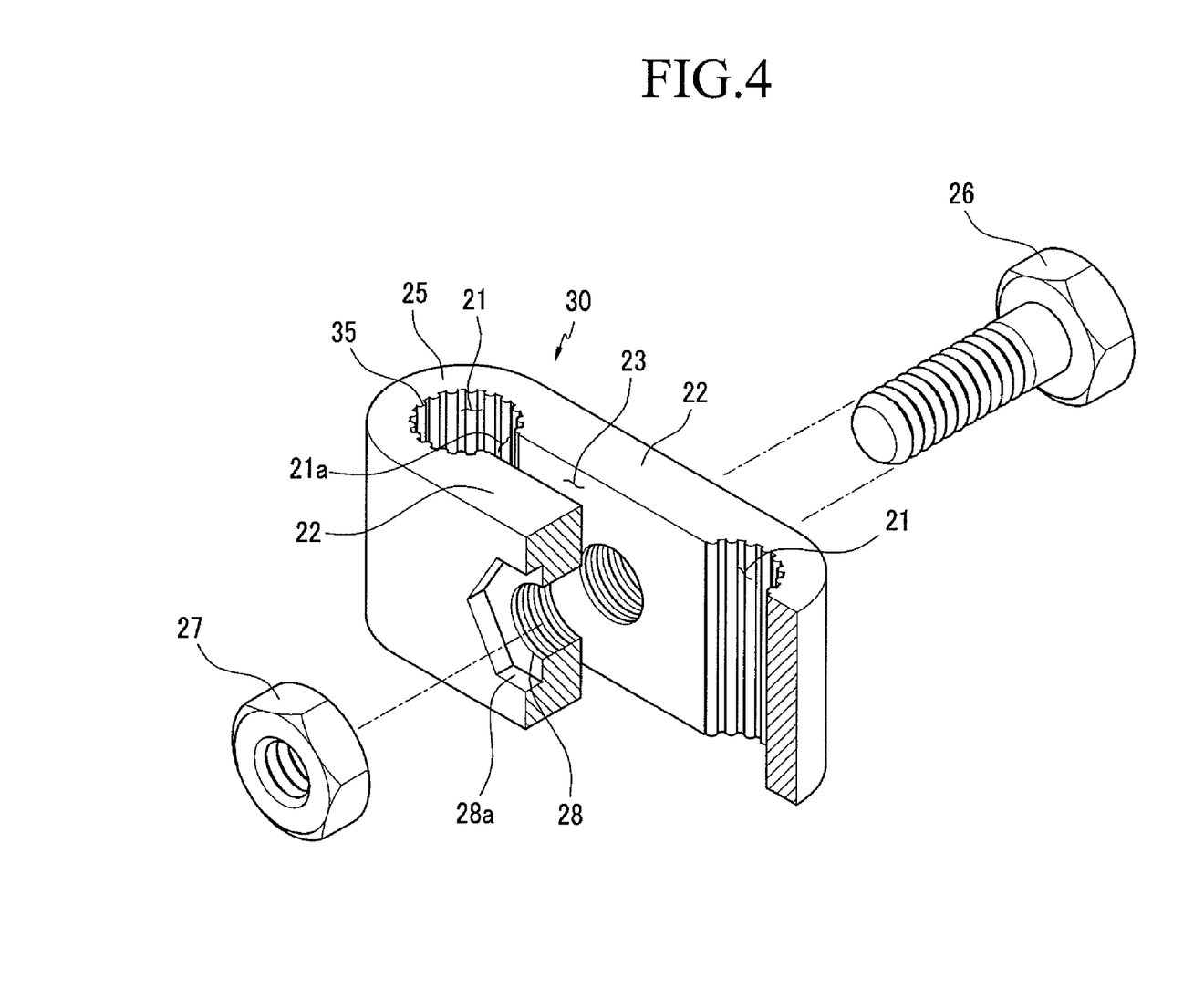
FIG. 4 is a partially cut-away perspective view representing a connecting member and a pressure member according to a second exemplary embodiment of the present invention.

FIG. 4 is a partially cut-away perspective view representing a connecting member and a pressure member according to a second exemplary embodiment of the present invention.

Referring to FIG. 4, a connecting member 30 according to the second exemplary embodiment of the present invention includes protrusions 35 formed at the penetration hole 21. The connecting member 20 is the same as the connecting member 20 according to the first exemplary embodiment of the present invention except for the protrusions 35, and therefore descriptions of parts having been described will be omitted.

The protrusions 35 formed on the penetration hole 21 are extended in a height or vertical direction of the penetration hole 21. The protrusions 35 extend from a lower part to an upper part of the penetration hole 21. In addition, the protrusions 35 are arranged along an inner circumference of the penetration hole 21 while having predetermined intervals between the protrusions 35.

When the protrusions 35 are formed on the penetration hole 21 and the pressure member 24 compresses the connecting part 22 to narrow the gap 23, the protrusions 35 tightly grip the external circumferential surfaces of the electrode terminals 12 and 13, and therefore the fitting portion 25 and the electrode terminals 12 and 13 may be further stably contacted.

When the pressure member 24 compresses the connecting part 22, the gaps 21a are narrowed, and a cross-section of the penetration hole 21 is varied. In this case, if the shape of the penetration hole 21 is irregularly varied, the fitting portion 25 and the electrode terminals 12 and 13 may not be appropriately contacted.

However, in the second exemplary embodiment of the present invention, the plurality of protrusions 35 are formed on an inner surface of the penetration hole 21, and therefore the protrusions 35 and the electrode terminals 12 and 13 may be tightly contacted to each other. Therefore, a stable contact state may be maintained.

Figure 5:
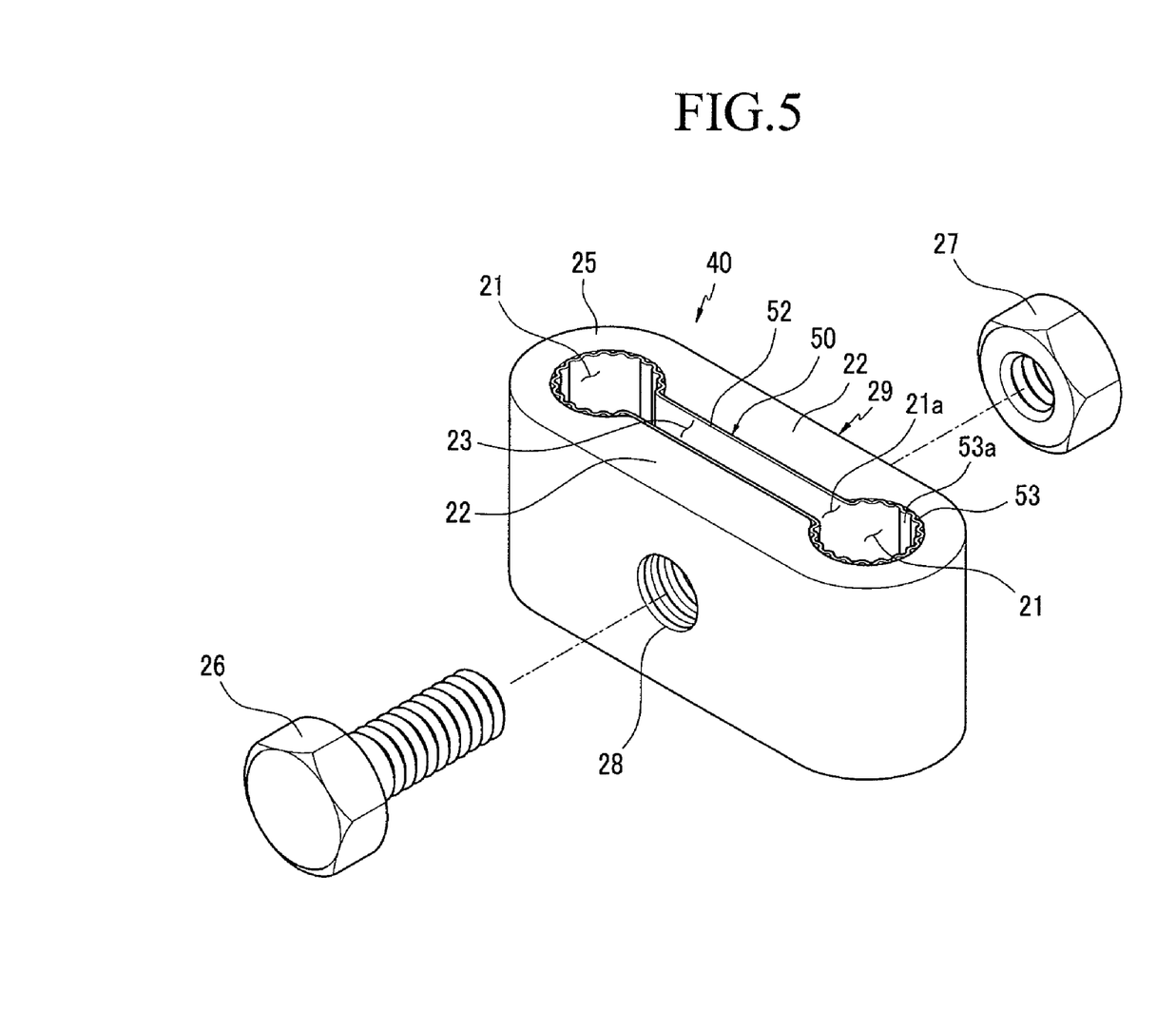
FIG. 5 is a perspective view representing a connecting member and a pressure member according to a third exemplary embodiment of the present invention.

FIG. 5 is a perspective view representing a connecting member and a pressure member according to a third exemplary embodiment of the present invention.

Referring to FIG. 5, a connecting member 40 according to the third exemplary embodiment of the present invention includes a body 29 including the gap for connecting the penetration holes 21 and a conductor 50 being close to an inner surface of the body 29.

The connecting member 40 according to the third exemplary embodiment of the present invention is the same as the connecting member 20 according to the first exemplary embodiment of the present invention, and therefore descriptions of parts having been described will be omitted.

The conductor 50 includes a fitting portion conductive plate 53 being adjacent to the inner circumference of the penetration hole 21, and a connecting part conductive plate 52 being adjacent to the conductive plate 53 and the connecting part 22. The fitting portion conductive plate 53 is formed to be connected to the connecting part conductive plate 52, and therefore the conductor 50 is formed in a band shape.

A plurality of elastic protrusions 53a are arranged on the fitting portion conductive plate 53 along the inner circumference of the penetration hole 21, and the elastic protrusions 53a are shaped as ribs along a height direction of the penetration hole 21.

The shape of the elastic protrusions 53a may be elastically varied by external force. When the gap 23 is narrowed by the pressure member 24, the shape of the elastic protrusions 53a vary to closely contact the electrode terminals 12 and 13, and therefore a contact area between the connecting member 40 and the electrode terminals 12 and 13 increases. Therefore, output deterioration of the battery module as a result of contact resistance may be reduced.

Since the body 29, according to the exemplary embodiment of the present invention, is formed as an electrical insulator, accidents including an electric shock may be prevented when a connecting member 40 is provided.

Figure 6:
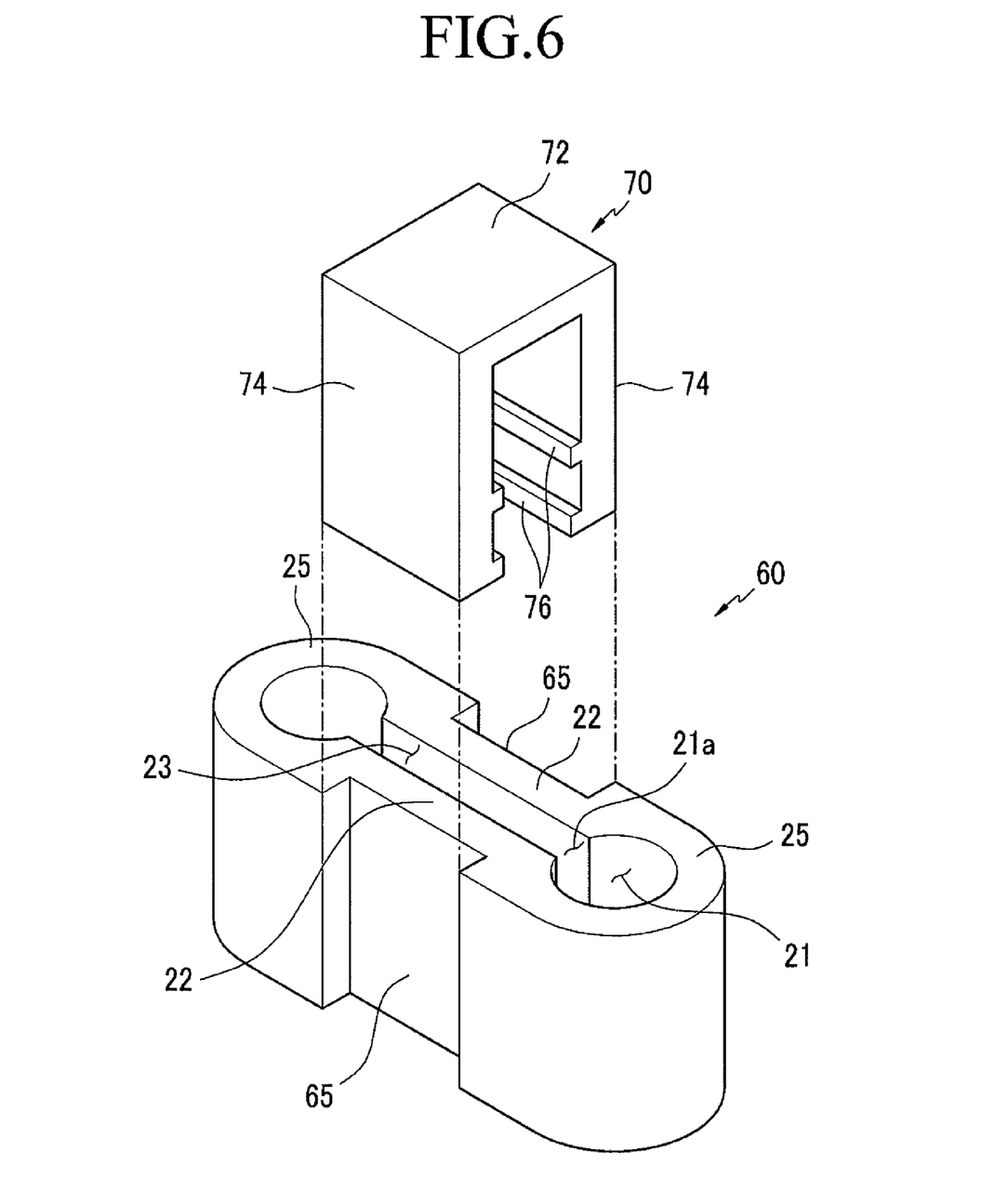
FIG. 6 is a perspective view representing a connecting member and a pressure member according to a fourth exemplary embodiment of the present invention.

FIG. 6 is a perspective view representing a connecting member and a pressure member according to a fourth exemplary embodiment of the present invention.

Referring to FIG. 6, a connecting member 60 according to the fourth exemplary embodiment of the present invention includes a groove 65 formed on an external surface of the connecting part 22.

The connecting member 60 according to the fourth exemplary embodiment of the present invention is the same as the connecting member 20 according to the first exemplary embodiment of the present invention except for the groove 65 formed on the external surface thereof, and therefore descriptions of parts having been described will be omitted.

The groove 65 is formed on the external surface of the connecting part 22, and is extended from a lower end part to an upper end part in a height direction of the connecting member 60.

A pressure member 70 is provided to the groove 65, and the pressure member 70 includes a base 72 being close to the upper end part of the connecting member 60 and supporting parts 74 extended from both ends of the base 72 to be inserted to the groove 65. The supporting parts 74 and the base 72 are formed in a plate shape, and each supporting part 74 is bent at a right angle to the base 72.

As described, the pressure member 70 is formed in a clip shape to compress the connecting member 60 at the connecting parts 22.

In addition, a plurality of protrusions 76 are formed on facing surfaces of the supporting parts 74, and the protrusions 76 are arranged in a height direction of the supporting part 74 and are extended in a width direction of the supporting part 74 so that the protrusions 76 are shaped as ribs. Since the protrusions 76 inwardly compress the connecting parts 22, the inner surface of the penetration holes 21 closely contact the electrode terminals 12 and 13.

In a conventional clip, great pressure is applied to a part being close to the base 72 and almost no pressure is applied to a part being away from the base 72 since the protrusions 76 are not provided. However, in the fourth exemplary embodiment of the present invention, since the protrusions 76 are provided, appropriate pressure may be applied to the part being away from the base 72.

Particularly, since the protrusions 76 are formed on the part being away from the base 72 in the fourth exemplary embodiment of the present invention, appropriate pressure may be applied to a side opposite to the base 72.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
   a plurality of unit batteries each of the plurality of unit batteries comprising electrode terminals protruded from the unit batteries;
   a connecting member to which the electrode terminals from adjacent unit batteries are inserted, the connecting member comprising a first and a second fitting portions including a gap on one side of the fitting portions, the fitting portions receiving the electrode terminals wherein the fitting portions include an interior surface having a length substantially equal to the length of the electrode terminals and a plurality of straight parallel elastic protrusions of a first height that engage the electrode terminals and are positioned adjacent the interior surface of the fitting portions so as to extend the entire length of the interior surface at the first height and so that there is a gap between each of the protrusions and the interior surface of the fitting portion so that the elastic protrusions are deformable and a first and second connecting parts for connecting the first and second fitting portions while having the gap between the first and second connecting parts wherein the connecting member is formed of an electrical insulator and defines an interior surface;

a first and a second conductive plates that define the interior surface of the fitting portions of the connecting member and a third conductive plate that extends between the first and second conductive plates so as to electrically interconnect the first and second conductive plates, wherein the first, second and third conductive plates are formed on the interior surfaces of the connecting member so as to be insulated by the connecting member; and a pressure member for compressing the first and second connecting parts so as to narrow the gap between the connecting parts.

2. The battery module of claim 1, wherein at least one of the first and second connecting parts defines a hole.

3. The battery module of claim 2, wherein the pressure member includes a bolt inserted into the hole and a nut screwed with the bolt, such that the first and second connecting parts are interposed between the nut and the bolt.

4. The battery module of claim 3, wherein at least one of the first and second connecting parts define a nut groove into which the nut is inserted.

5. The battery module of claim 1, wherein the protrusions are extended in a height direction of the first and second fitting portions, and the plurality of protrusions are arranged along an inner circumference of the first and second fitting portions while having intervals between the protrusions.

6. The battery module of claim 1, wherein the connecting member includes a body forming an outer shape and a conductor being close to an inner surface of the body.

7. The battery module of claim 6, wherein the body is formed as an electrical insulator.

8. The battery module of claim 1, further comprising a conductor wherein the conductor comprises a first and second fitting portion conductive plates being adjacent to the first and second fitting portions and a connecting part conductive plate being adjacent at least one of the first and second connecting parts, wherein the first and second fitting portion conductive plates comprises an elastic protrusion.

9. The battery module of claim 8, wherein the elastic protrusion is extended in a height direction of the connecting member.

10. The battery module of claim 8, wherein the elastic protrusion is provided as a multiple to be arranged along an inner circumference of the first and second fitting portions while having intervals between the elastic protrusions.

11. A battery module comprising:
a plurality of unit batteries capable of being repeatedly charged and discharged wherein the unit batteries each include terminals having external surfaces;
a connecting member for electrically connecting the plurality of unit batteries, wherein the connecting member defines penetration holes to which terminals formed in the unit batteries are inserted wherein the penetration holes include an interior surface having a length substantially equal to the length of the terminals and a plurality of straight parallel elastic protrusions of a first height that engage the terminals are positioned adjacent the interior surfaces of the penetration holes wherein the plurality of the protrusions extend along the entire length of the interior surfaces at the first height and so that there is a gap between each of the elastic protrusions and the interior surface of the fitting portion so that the elastic protrusions are deformable and a gap connecting the penetration holes and wherein the connecting member includes an external surface;

a first and a second conductive plates that define the interior surfaces of the penetration holes of the connecting member and a third conductive plate that extends between the first and second conductive plates so as to electrically interconnect the first and second conductive plates, wherein the first, second and third conductive plates are formed on the interior surfaces of the connecting member so as to be insulated by the connecting member; and a pressure member for compressing the external surface of the connecting member so that an inner surface of the penetration hole may be urged into contact with the external surfaces of the electrode terminal.

12. A connector assembly to interconnect terminals on adjacent unit batteries, the connector assembly comprising:
terminal receiving portions that define openings that are sized so as to receive the terminals on the unit batteries wherein the openings include an interior surface having a length substantially equal to the length of the terminals and a plurality of straight parallel elastic protrusions of a first height that engage the terminals are positioned adjacent the interior surface wherein the plurality of protrusions extend along the entire length of the interior surface at the first height and so that there is a gap between each of the elastic protrusions and the interior surface of the fitting portion so that the elastic protrusions are deformable;

a compressible connecting part that interconnects the terminal receiving portions and wherein the compressible connecting part is compressible so that the openings in the terminal receiving portions are reduced in size to thereby result in the terminal receiving portions being urged into contact with the terminals; and a pressure member that engages with the compressible connecting part so as to compress the connecting member.

13. The assembly of claim 12, wherein the terminal receiving portions comprise fitting portions having inner surfaces sized to fit around the outer circumference of the battery terminals and wherein the fitting portions have outer ends that define a gap.

14. The assembly of claim 13, wherein a plurality of ridges are formed on the inner surfaces of the fitting portions.

15. The assembly of claim 12, wherein the compressible connecting part comprises a plurality of connecting members having outer ends that are coupled to the outer ends of the fitting portions at each outer end so as to extend parallel to each other and wherein compression of the connecting members towards each other results in a reduction in the size of the gap in the fitting portions.

16. The assembly of claim 12, wherein the pressure member comprises a nut and bolt assembly that engages with the compressible connecting part.

* * * * *